United States Patent [19]

Gray

[11] 4,329,102
[45] May 11, 1982

[54] AUTOMATIC BALE WAGON

[76] Inventor: John H. Gray, Rte. 1, Box 51, Keatchie, La. 71046

[21] Appl. No.: 185,315

[22] Filed: Sep. 8, 1980

[51] Int. Cl.³ .................. A01D 87/12; B60P 1/48
[52] U.S. Cl. .................. 414/24.5; 414/501; 414/515
[58] Field of Search .................. 414/24.5, 24.6, 501, 414/515, 551, 911

[56] References Cited

U.S. PATENT DOCUMENTS

| | | | |
|---|---|---|---|
| 1,337,332 | 4/1920 | Sills | 414/551 |
| 2,463,643 | 3/1949 | Recker | 414/515 |
| 2,512,339 | 6/1950 | Knapp | 414/515 |
| 3,164,410 | 1/1965 | Robinson et al. | 414/515 X |
| 4,090,616 | 5/1978 | Runyan et al. | 414/24.5 |
| 4,261,676 | 4/1981 | Balling | 414/24.5 |

Primary Examiner—Leslie J. Paperner

[57] ABSTRACT

An automatic bale wagon designed to automatically side load, transport and rear unload multiple, round bales of hay using an electric winch which is wired to the cab of a pickup truck which tows the bale wagon. The round bales of hay typically weigh about 1500 pounds, and are automatically loaded by first towing the bale wagon into pickup position with respect to a selected bale of hay; activating the winch to lift the carriage apparatus and the bale; spilling the bale onto a roller bed positioned in the bale wagon; and automatically sliding the bale to a pre-determined position on the roller bed.

11 Claims, 4 Drawing Figures

AUTOMATIC BALE WAGON

BACKGROUND OF THE INVENTION

1. Field of the Invention

This invention relates to the loading of bales of hay onto transport wagons and trailers, and more particularly, to the automatic loading, transporting and unloading of round, 1,500 pound rolls of hay onto and from a bale wagon having a roller bed and a pivoting loading carriage, the latter of which is activated by an electric winch. The automatic bale wagon is removably attached to a pickup truck and is initially maneuvered and positioned with the carriage fork tines beneath a selected bale of hay. When the electric 3-drum winch is activated, the carriage and bale are lifted and the bale of hay is rolled by gravity onto the wagon roller bed. The bale is then automatically moved to a predetermined spot on the roller bed, and another bale is engaged and loaded. The automatic bale wagon of this invention is capable of handling multiple round bales of hay, and in a preferred embodiment of the invention, the wagon is designed to carry four such rolls, which are automatically unloaded from the rear of the bale wagon by activation of the electric winch in a desired sequence.

2. Description of the Prior Art

Techniques for loading hay into wagons for transportation to barns or livestock feeding areas have taken many forms in the prior art. Early loading procedures were directed to the manual tossing of loose hay into large wagons or trailers by means of hay forks for such transportation. Later techniques included the use of automatic hay balers which baled the hay and subsequently placed it on a storage rack or trailer, which either forms an integral part of, or is towed by the bailer. Such devices are generally designed to bail the familiar rectangular-shaped hay bales. Other loading techniques included side loading, front loading and rear loading bale wagons which were generally designed for manual operation using ropes and slings to achieve the desired loading of the bales. Typical of these machines is the "Hay and Shock Loader" disclosed in U.S. Pat. No. 2,364,308 to R. Niewendorp, which is designed to be pulled by a tractor. A single bale, rear loading apparatus is illustrated in U.S. Pat. No. 3,935,954 to Donald L. Woods. The device includes a forklift frame which pivots over the trailer wheels to lift a round bale of hay. The trailer is pulled by a tractor or other vehicle.

Various other lifting devices for specific use in cooperation with vehicles in lifting and transporting the round hay bales are known to those skilled in the art. Many of these devices are designed for use with the so-called "three point" lifting device mounted on the back of tractors. The three point hydraulic lifting mechanism is particularly well known to those who use tractors in agriculture and is useful for such lifting operations as transporting bales of hay and pulling various farm implements, such as discs and grass-cutting implements. While the tractor-mounted, three point mechanical arrangement is a very useful feature in various agricultural and other operations, use of such a device generally requires that the operator be exposed to the weather except under rare circumstances where the tractor is enclosed. Furthermore, contact between the three point mechanical lifting attachment and the object or objects to be lifted frequently requires that the operator make the connection manually by a combination of adjusting the position of the tractor and physically adjusting the load to correspond to the lifting apparatus. Accordingly, this requires that the operator be exposed in inclement weather whenever he desires to use the tractor-mounted mechanism under adverse weather conditions.

Accordingly, it is an object of this invention to provide a new and improved automatic bale wagon which combines an automatic bale-engaging carriage lifting device with a bale storage platform having a roller bed for lifting, loading and positioning round hay bales in the field.

Another object of the invention is to provide a new and improved bale wagon for automatically lifting, loading, positioning and transporting multiple round bales of hay, which wagon includes an electric winch having three cable drums; a pivoting carriage having bale tines for initially engaging a bale of hay, lifting the bale and subsequently depositing the bale onto a roller bed provided in the wagon frame; and a rake means mounted in cooperation with the roller bed to automatically position the bale in a pre-selected position on the roller bed after it has been loaded.

Yet another object of this invention is to provide a new and improved automatic bale wagon which automatically performs the functions of lifting, positioning, transporting and unloading round bales of hay by means of a pivoting carriage attached to the wagon frame and having bale-engaging fork tines, and a roller bed mounted in the frame, with an electric winch having three cable drums and a system of cables for activating the carriage and operating a movable rake on the roller bed to engage a bale of hay, deposit it on the roller bed, and deliver it to a desired spot on the bed.

Yet another object of this invention is to provide an automatic bale wagon which is designed to be towed by a pickup truck or other vehicle, and is fitted with a pivoting carriage; a roller bed; a movable rake mounted above the roller bed and designed to traverse the length of the roller bed; and an electric winch having three drums provided with a system of three cables wound in different directions on the drums for sequentially lifting the carriage and moving the rake over the roller bed to automatically engage, lift and deposit a round bale of hay on the roller bed and position the bale of hay in a desired location on the bed by means of the rake.

SUMMARY OF THE INVENTION

These and other objects of the invention are provided in a new and improved automatic bale wagon for lifting, loading, transporting and unloading round bales of hay, which wagon includes a trailer frame fitted for towing by a vehicle and having a roller bed, a movable rake mounted for traversal of the roller bed, and a pivoting carriage having a pair of bale-engaging fork tines on one side of the frame for engaging, lifting and depositing a round bale of hay on the roller bed responsive to the activation of an electric winch having three cable drums and a system of cables designed to sequentially lift the carriage and move the rake.

BRIEF DESCRIPTION OF THE DRAWING

The invention will be better understood by reference to the accompanying drawing, wherein.

DESCRIPTION OF THE PREFERRED EMBODIMENTS

Figure 1:
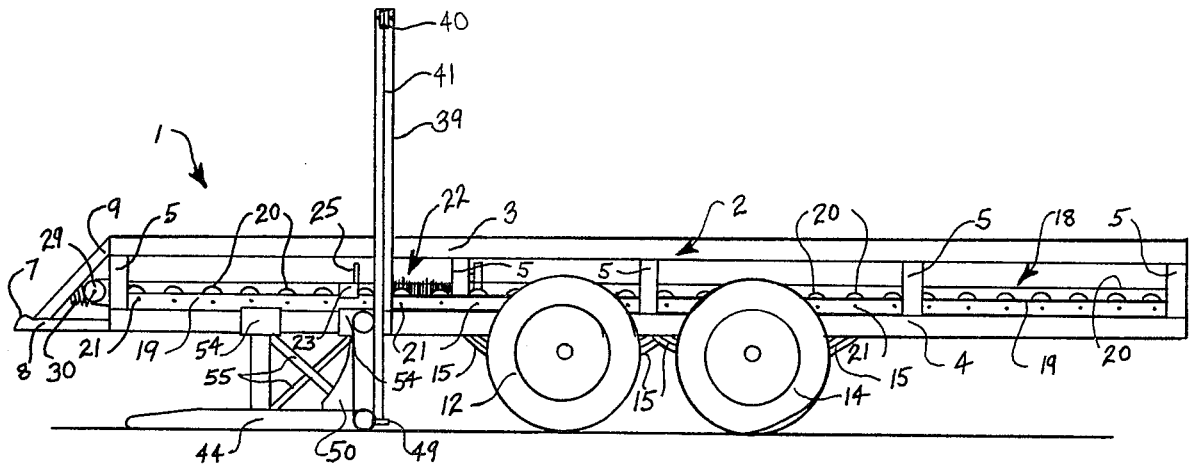
FIG. 1 is a left side elevation of a preferred embodiment of the automatic bale wagon of this invention.
Figure 2:
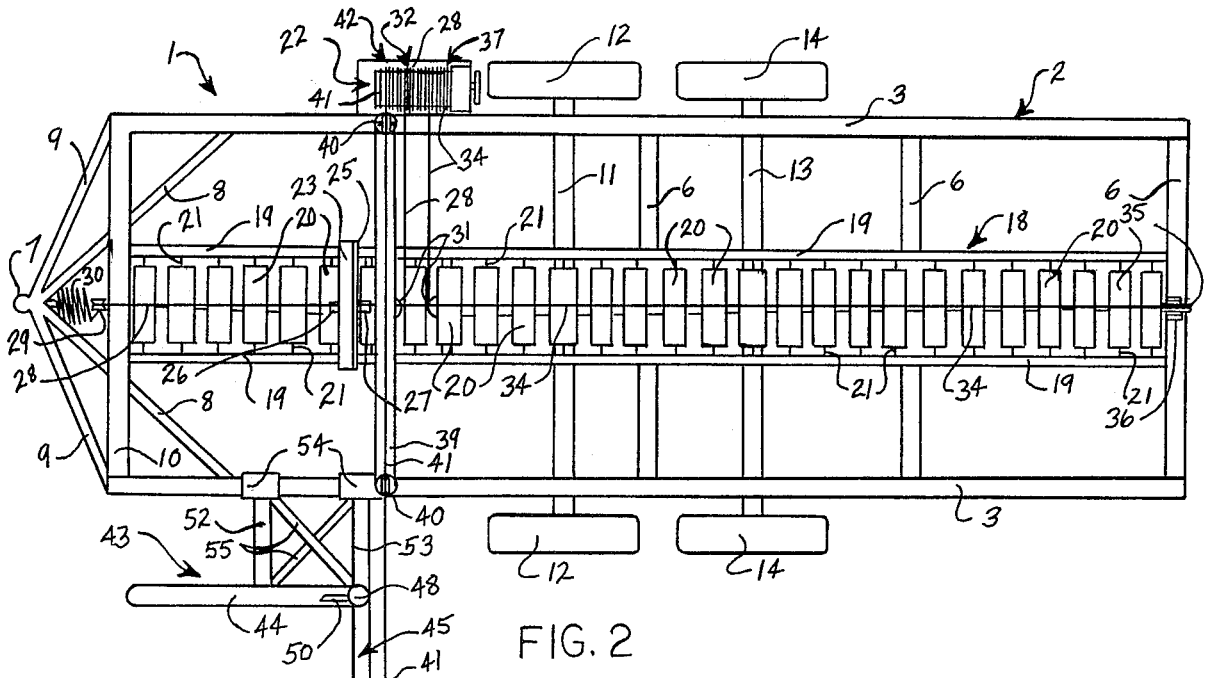
FIG. 2 is a top elevation of the automatic bale wagon illustrated in FIG. 1.
Figure 3:
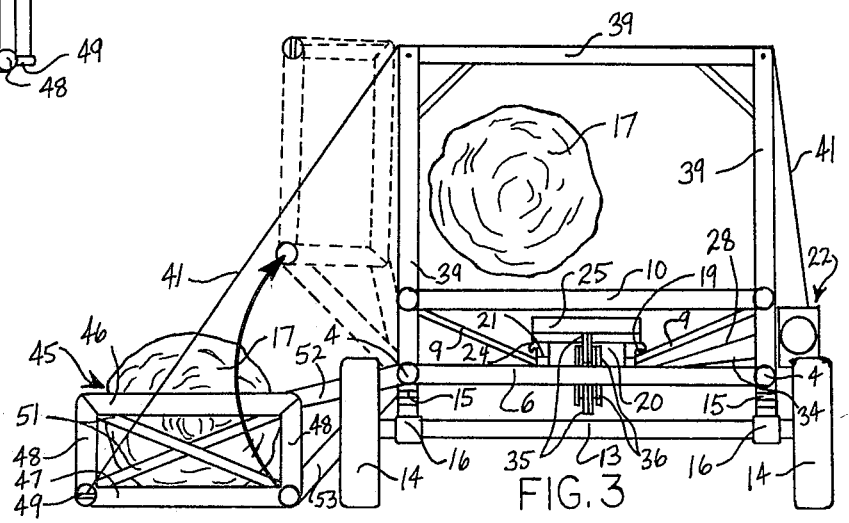
FIG. 3 is a rear elevation of the bale wagon illustrated in FIGS. 1 and 2.

Referring now to FIGS. 1-3 of the drawing, the automatic bale wagon of this invention is generally illustrated by reference numeral 1, and includes a frame 2, having an upper rail 3 and a lower rail 4, each spaced by vertical rail supports 5 and forming both sides of the wagon frame 2. Horizontal rail supports 6 are welded at each end to lower rails 4 and serve to space the upper rail 3 and lower rail 4 trailer side assemblies, and a forward frame brace 10 spans the forward ends of upper rail 3 to additionally brace frame 2. A conventional trailer hitch 7 is provided at the forward end of frame 2 and is attached to the frame 2 by means of bottom hitch braces 8 and top hitch braces 9, as illustrated. The automatic bale wagon 1 is supported by a front axle 11, fitted with a pair of front wheels 12, and a rear axle 13, spaced from front axle 11 and provided with a pair of rear wheels 14. Front axle 11 and rear axle 13 are conventionally mounted to lower rail 4 by frame 2 by means of wheel springs 15 and spring mounts 16, the latter of which are more particularly illustrated in FIG. 3 of the drawing. A roller bed is generally illustrated by reference numeral 18, and extends the entire length of frame 2 by mounting on horizontal rail supports 6. Roller bed 18 includes a pair of channels 19 positioned in spaced, parallel relationship with the flanges facing outwardly, and having rollers 20, fitted with roller pins 21, mounted in spaced, rotatable relationship in channels 19. In a preferred embodiment of the invention rollers 20 are freely rotatably mounted on roller pins 21, and roller pins 21 are in turn secured in channels 19, as illustrated in FIGS. 1 and 2. A winch is generally illustrated by reference numeral 22 and is mounted on the right hand side of automatic bale wagon 1 as the wagon is viewed from the rear. In another preferred embodiment of the invention winch 22 is characterized as a 12 volt electric winch having a pulling capacity of about 8000 pounds. Referring to FIGS. 2 and 3, a rake slide 23, having rake side flanges 24, which slidably cooperate with the top webs of channels 19, is slidably fitted on channels 19 above rollers 20. An upward standing rake 25 is provided on rake slide 23, and is adapted to traverse channels 19 and rollers 20 responsive to activation of winch 22 by means of a system of cables, as hereinafter described.

Referring now specifically to FIG. 2 of the drawing, a front rake flange 26 is fitted to the front side of rake slide 23, and a rear rake flange 27 is provided on the back side of rake slide 23, as illustrated. A front rake cable 28, having one end wound on front rake cable drum 32, cooperating with winch 22, is wound around the front one of bottom rake cable pulleys 31 positioned on frame 2 beneath roller bed 18, and is strung under roller bed 18 forwardly around a front rake cable pulley 29 and rearwardly over roller bed 18, and is attached to front rake flange 26. Front rake cable pulley 29 is suspended from a pulley spring 30, which is in turn attached to bottom hitch braces 8 and top hitch braces 9 of frame 2. A rear rake cable 34 is provided with one end wound on rear rake cable drum 37 and the other end threaded through the rear one of bottom rake cable pulleys 31 and rearwardly under roller bed 18, around rear rake cable pulleys 35, and above the roller bed forwardly, where it is attached to rear rake flange 27. Rear rake cable pulleys 35 are secured to pulley brackets 36, which are in turn welded to the rear one of horizontal rail supports 6. It will be appreciated by those skilled in the art that a single rear rake pulley can be strategically positioned and used instead of the two rear rake cable pulleys 35, although two such pulleys are preferred for an optimum, smooth movement of rear rake cable 34. It will be further appreciated that the winding of front rake cable 28 and rear rake cable 34 are in opposite directions on front rake cable drum 32 and rear rake cable drum 37, respectively, with front rake cable 28 wound in the clockwise direction, and rear rake cable 34 wound in the counter-clockwise direction.

Referring again to FIGS. 1-3 of the drawing, frame 2 of automatic bale wagon 1 is provided with a carriage lift bar 39, which spans the width of automatic bale wagon 1 and is further provided with a pair of carriage lift bar pulleys 40 at each corner thereof and above frame 2. A carriage cable 41 is provided on carriage lift bar pulleys 40 with one end attached to carriage cable drum 42 and the other end secured to a carriage cable bracket 49, attached to carriage frame 45 of carriage 43. Carriage 43 is pivotally attached to frame 2 by means of a forward carriage lift arm 52 and a rear carriage lift arm 53, and includes a carriage frame 45, to which is attached a pair of spaced bale tines 44, extending forwardly of the carriage frame 45. Carriage frame 45 is shaped by an upper frame member 46 and a lower frame member 47, positioned in parallel relationship, and spaced by vertical frame supports 48, as is more particularly illustrated in FIG. 3. Tine gussets 50 are attached to bale tines 44 and to vertical frame supports 48, and serve to strengthen bale tines 44 when a hay bale 17 is in position on the tines, as illustrated in FIG. 1. A pair of carriage frame braces 51 are also provided in carriage frame 45 to further stiffen and support the frame, as illustrated in FIG. 3. One end of forward carriage lift arm 52 and rear carriage lift arm 53, respectively, are attached to carriage frame 45 and the other end to lift arm collars 54, which encircle upper rail 3 and permit carriage 43 to pivot on upper rail 3 with respect to carriage frame 2 responsive to the winding of carriage cable 41 on carriage cable drum 42. Lift arm braces 55 are provided between forward carriage lift arm 52 and rear carriage lift arm 53 to further brace the lift arms.

Figure 4:
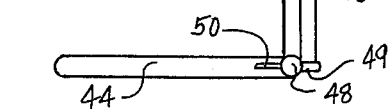
FIG. 4 is a front elevation of a preferred embodiment of one of the bale tines used in the automatic bale wagon illustrated in FIGS. 1-4.

Referring now to FIG. 4 of the drawing, in a preferred embodiment of the invention bale tines 44 are shaped with the front portion of the tines flattened to form bale tine tips 56 in order to better engage the hay bales during the bale loading operation. It will be appreciated by those skilled in the art that bale tines 44 may be of substantially any shape, although it has been found that tines shaped from pipe and having flattened bale tine tips 56 are preferred for use with the automatic bale wagon of this invention.

Referring again to FIGS. 2 and 3 of the drawing in operation, the automatic bale wagon 1 is used as follows. The wagon is first attached to a pickup truck or other vehicle by means of trailer hitch 7, and is transported to a field or area where round hay bales, generally weighing about 1,600 pounds each, have been previously baled and are ready for transportation to a barn or a livestock feed area. The driver of the pickup truck initially maneuvers the automatic bale wagon to a position where the forwardly extending bale tines 44, positioned just above the ground, are located beneath a bale of hay as illustrated in FIG. 3. When the automatic bale wagon 1 is advanced to the point where the rear end of the hay bale 17 is resting against carriage frame 45, electric winch 22 is activated from the cab of the pickup truck and the loading phase of automatic bale wagon 1 begins. Referring now to FIG. 2 of the drawing, as heretofore described, and in a preferred embodiment of the invention, under circumstances where winch 22 drives front rake cable drum 32, rear rake cable drum 37 and carriage cable drum 42 in the clockwise direction, front rake cable 28 is wound on front rake cable drum 32 in a clockwise direction, while rear rake cable 34 is wound on rear rake cable drum 37 in the counter-clockwise direction. Under these circumstances, the carriage cable 41 is also wound on carriage cable drum 42 in a clockwise direction. Accordingly, when winch 22 is activated carriage cable 41 tightens on carriage cable drum 42 and begins lifting carriage 43 and hay bale 17 rotatably upward and toward frame 2, as illustrated in FIG. 3. Furthermore, front rake cable 28 also tightens and begins pulling rake slide 23 and rake 25 forwardly on channels 19, as rear rake cable 34 unwinds from rear rake cable drum 37 to permit forward movement of the rake and rake slide. When carriage 43 reaches a position illustrated by the phantom lines in FIG. 3, and hay bale 17 rolls out of the carriage 43 onto roller bed 18, rake slide 23 and rake 25 have moved to a pre-selected position at the extreme forward end of roller bed 18, and are forward of hay bale 17 as the bale comes to rest on roller bed 18. Accordingly, winch 22 is then reversed, and carriage 43 begins to descend to its original position, while rear rake cable 34 tightens and begins moving rake slide 23 and rake 25 rearwardly and front rake cable 28 slackens to permit this rearward movement of the rake and rake slide. Accordingly, rake 25 contacts the forward end of hay bale 17 and causes it to move rearwardly with the rake slide 23 and rake 25 on rollers 20 in roller bed 18 until winch 22 is stopped. The hay bale 17 is then positioned approximately in the center of automatic bale wagon 1 over front axle 11 and rear axle 13 at that point in time when carriage 43 reaches its maximum downward movement, and rake slide 23 and rake 25 have stopped. The automatic bale wagon 1 is now in position to engage and load a second bale, and the loading procedure is exactly the same as that outlined above. When loaded, the second hay bale 17 will contact the first bale responsive to the rearward movement of rake slide 23 and rake 25, and will force the first bale further rearwardly on roller bed 18 as the second bale is moved into the relative position of the first bale. This loading procedure is continued until the desired number of bales are loaded on the automatic bale wagon, and the wagon is then towed to an area of storage or cattle feeding, as desired, for removal of the bales.

Removal of the hay bales 17 is accomplished in the same manner as loading, except that winch 22 is activated to cause rake slide 23 and rake 25 to rearwardly traverse the length of roller bed 18 and cause the bales to be removed from the rear end of automatic bale wagon 1.

It will be appreciated by those skilled in the art that the automatic bale wagon of this invention is characterized by great convenience and utility in that round bales of hay of significant size and weight can be automatically loaded, transported and unloaded without the necessity of the operator exiting the cab of the pickup truck or towing vehicle. Accordingly, appropriate electrical and control connections may be made from winch 22 to the pickup truck or towing vehicle in order to operate winch 22 in the forward and reverse direction as desired to load and unload the hay bales. In a preferred embodiment of the invention these connections are of the quick "disconnect" type which are well known to those skilled in the art. It will be further appreciated that the automatic bale wagon may be designed to accommodate substantially any number of round bales desired; however, as heretofore described, in a most preferred embodiment of the invention the automatic bale wagon is designed to accommodate four, 1600 pound round hay bales for convenience in loading, transporting and unloading the bales at the desired destination.

Referring again to FIGS. 1 and 2 of the drawing, in yet another preferred embodiment of the invention a pulley spring 30 is used to suspend a single front rake pulley 29 from the wagon frame braces in order to properly compensate for the forward and reverse operation of winch 22 to take the slack out of front rake cable 28 and rear rake cable 34 as the cables wind and unwind on front rake cable drum 32 and rear rake cable drum 37, respectively. This slack results from the increasing diameter of the cable receiving drum which is accumulating cable and the corresponding decreasing diameter of the cable dispensing drum where the cables are wound in the opposite direction.

Having described my invention with the particularity set forth above, what is claimed is:

1. An automatic bale wagon for towing by a vehicle and for loading, transporting and unloading round bales of hay comprising:
   (a) a wagon frame;
   (b) at least one set of wheels carrying said frame;
   (c) a roller bed mounted in said frame and extending substantially the entire length of said frame;
   (d) bale-engaging carriage means pivotally attached to one side of said frame and extending outwardly of said frame;
   (e) winch means mounted on the opposite side of said frame from said carriage means and provided with outer, middle and inner winch drums journalled for rotation in said winch means;
   (f) an outer cable having one end wound on said outer winch drum; a middle cable having one end wound on said middle winch drum in the same direction as said outer cable, and an inner cable having one end wound on said inner winch drum in the opposite direction from said outer cable and said middle cable;
   (g) first lower pulley means disposed opposite said middle winch drum and beneath said roller bed on said frame, and forward pulley means cooperating with the forward end of said frame for receiving said middle cable and extending the opposite end of said middle cable from said middle winch drum, around said first lower pulley means and forward beneath said roller bed and upwardly around said forward pulley means and then rearwardly above said roller bed;
   (h) second lower pulley means disposed opposite said inner winch drum and beneath said roller bed on said frame, and rear pulley means mounted on the rear end of said frame, for receiving said inner cable and extending the opposite end of said inner cable from said inner winch drum, around said second lower pulley means and rearward beneath said roller bed and upwardly around said rear pulley means and then forwardly above said roller bed;
(i) a carriage lift bar mounted on said frame in alignment with said outer winch drum and extending above said frame, and lift bar pulley means carried by said lift bar for receiving said outer cable and extending the opposite end of said outer cable from said outer winch drum around said lift bar pulley means and said carriage lift bar for attachment to said carriage; and
(j) upward standing rake means slidably carried by said roller bed and attached to said opposite end of said middle cable on the front side of said rake means, and attached to said opposite end of said inner cable on the rear side of said rake means for causing said rake means to traverse said roller bed responsive to activation of said winch and winding of said middle cable and said inner cable in opposite directions on said middle winch drum and said inner winch drum, respectively.

2. The automatic bale wagon of claim 1 further comprising spring means having one end carried by the forward end of said frame and the opposite end attached to said forward pulley means to compensate for slack in said middle cable and said inner cable when said winch is operating.

3. The automatic bale wagon of claim 1 further comprising a trailer hitch coupling attached to the forward end of said frame for removably coupling said automatic bale wagon to said vehicle.

4. The automatic bale wagon of claim 1 wherein said at least one set of wheels is two sets of wheels mounted on said frame in tandem relationship.

5. The automatic bale wagon of claim 1 wherein said at least one set of wheels is two sets of wheels mounted on said frame in tandem relationship, and further comprising:
(a) spring means having one end carried by the forward end of said frame and the opposite end attached to said forward pulley means to compensate for slack in said middle cable and said inner cable when said winch is operating; and
(b) a trailer hitch coupling attached to the forward end of said frame for removably coupling said automatic bale wagon to said vehicle.

6. The automatic bale wagon of claim 1 wherein said carriage means includes a pair of lift tines extending forwardly alongside said wagon in spaced, essentially parallel relationship and deployed in close proximity to the ground to engage a hay bale when said wagon is in loading configuration.

7. The automatic bale wagon of claim 1 wherein said roller bed is further characterized by a pair of channels positioned in spaced, parallel relationship in said frame, with the channel flanges of said channels facing outwardly and the web of said channels in essentially perpendicular position; a plurality of roller pins mounted in spaced relationship in said channels; and a plurality of rollers rotatably mounted on said roller pins.

8. The automatic bale wagon of claim 1 further comprising spring means having one end carried by the forward end of said frame and the opposite end attached to said forward pulley means to compensate for slack in said middle cable and said inner cable when said winch is operating, and wherein:
(a) said carriage means includes a pair of lift tines extending forwardly alongside said wagon in spaced, essentially parallel relationship and deployed in close proximity to the ground to engage a hay bale when said wagon is in loading configuration; and
(b) said roller bed is further characterized by a pair of channels positioned in spaced, parallel relationship in said frame, with the channel flanges of said channels facing outwardly and the web of said channels in essentially perpendicular position; a plurality of roller pins mounted in spaced relationship in said channels; and a plurality of rollers rotatably mounted on said roller pins.

9. The automatic bale wagon of claim 1 wherein said winch means is an electric winch and said vehicle is fitted with quick-disconnect couplings in cooperation with said winch means to provide power and operational control of said winch means from said vehicle.

10. The automatic bale wagon of claim 6 wherein said wagon frame, said carriage means and said lift tines are fabricated of pipe and further comprising a pair of carriage lift arms having one end attached to said carriage means, and collars fitted to the opposite ends of said carriage lift arms and rotatably fitted on said frame in concentric relationship, to effect pivoting of said carriage lift arms and said carriage means on said frame responsive to activation of said winch and winding of said outer cable on said outer winch drum.

11. The automatic bale wagon of claim 1 further comprising spring means having one end carried by the forward end of said frame and the opposite end attached to said forward pulley means to compensate for slack in said middle cable and said inner cable when said winch is operating; and wherein:
(a) said carriage means includes a pair of lift tines extending forwardly alongside said wagon in spaced, essentially parallel relationship and deployed in close proximity to the ground to engage a hay bale when said wagon is in loading configuration;
(b) said roller bed is further characterized by a pair of channels positioned in spaced, parallel relationship in said frame, with the channel flanges of said channels facing outwardly and the web of said channels in essentially perpendicular position; a plurality of roller pins mounted in spaced relationship in said channels; and a plurality of rollers rotatably mounted on said roller pins;
(c) said winch means is an electric winch and said vehicle is fitted with quick-disconnect couplings in cooperation with said winch means to provide power and operational control of said winch means from said vehicle; and
(d) said wagon frame, said carriage means and said lift tines are fabricated of pipe and further comprising a pair of carriage lift arms having one end attached to said carriage means, and collars fitted to the opposite ends of said carriage lift arms and rotatably fitted on said frame in concentric relationship to effect pivoting of said carriage lift arms and said carriage means on said frame responsive to activation of said winch and winding of said outer cable on said outer winch drum.

* * * * *